United States Patent
Kaspar

[11] Patent Number: 6,138,845
[45] Date of Patent: Oct. 31, 2000

[54] CRANE VEHICLE

[75] Inventor: Ernst Kaspar, Munderkingen, Germany

[73] Assignee: Compact Truck AG, Zug, Switzerland

[21] Appl. No.: 09/230,721

[22] PCT Filed: Jul. 25, 1997

[86] PCT No.: PCT/EP97/04059

§ 371 Date: Apr. 22, 1999

§ 102(e) Date: Apr. 22, 1999

[87] PCT Pub. No.: WO98/05581

PCT Pub. Date: Feb. 12, 1998

[30] Foreign Application Priority Data

Aug. 2, 1996 [DE] Germany ................ 296 13 415 U

[51] Int. Cl.[7] .................................................. B66C 23/78
[52] U.S. Cl. .......................................... 212/302; 212/303
[58] Field of Search ..................... 212/302, 303, 212/304, 305, 306, 231, 290, 291

[56] References Cited

U.S. PATENT DOCUMENTS

| | | | |
|---|---|---|---|
| 2,370,661 | 3/1945 | Hayes | 212/303 |
| 4,053,061 | 10/1977 | Lester | 212/291 |
| 4,394,913 | 7/1983 | Lanning et al. | 212/304 |
| 4,397,396 | 8/1983 | Kay et al. | 212/304 |
| 4,496,062 | 1/1985 | Gattu et al. | 212/302 |
| 5,213,222 | 5/1993 | Becker | 212/231 |

FOREIGN PATENT DOCUMENTS

| | | |
|---|---|---|
| 543276 | 11/1992 | European Pat. Off. . |
| 2020061 | 7/1970 | France .................... 212/291 |
| 1554735 | 10/1977 | United Kingdom . |

*Primary Examiner*—Thomas J. Brahan
*Attorney, Agent, or Firm*—Rothwell, Figg, Ernst & Manbeck, p.c.

[57] ABSTRACT

An automotive vehicle, in particular crane vehicle, has a chassis comprising a framework provided in the longitudinal axis of the vehicle. A slew ring is supported on the framework, and a superstructure which can be slewed relative to the chassis rests on the slew ring, in which superstructure a telescoping crane boom is provided. The vehicle comprises a 4-point-support, two points of support thereof being provided in the course of the longitudinal central axis of the vehicle and the two other points of support being provided at outrigger beams which are mounted in the region of the support of the slew ring, which can be extended in opposite directions transverse to the longitudinal axis of the vehicle and swivelled transverse to the longitudinal axis of the vehicle. This outrigger construction is only subject to bending in the crane operation and therefore does not have to be dimensioned with respect to torsional stresses. A vehicle crane with such a framework-outrigger construction can lift loads of 120 t with a maximum height of the vehicle (upper edge of the cab or the boom) of about 3.50 m. For a maximum load of e.g. 800 t, a height of the crane boom of 2.0 m can be provided without an overall height of 3.95 being exceeded. The vehicle crane has a slewing cab which can be slewed from its position for the driving operation to a plurality of positions for the crane operation. In the driving operation, the end of the crane boom points to the rear opposite to the direction of motion.

12 Claims, 5 Drawing Sheets

CRANE VEHICLE

The invention (innovation) relates to automotive vehicle cranes of the type stated in the preamble of claim 1 and further contains in particular a new framework and outrigger construction with a particular suitability for vehicle cranes.

Automotive vehicle cranes have to meet a plurality of requirements in order to be homologated to the traffic on public highways. In Germany, in this respect the regulations of the Road Traffic Type Approval Law (StVZO) are decisive.

Part of these requirements are a minimum cruising speed on public roads of 62 km/h and a visual range diameter for the driver with a radius R of $\leq 12$ m. In order to be authorized to drive without being accompanied by the traffic police, the maximum breadth of the crane vehicle should not exceed <3 m. Due to the limited overhead clearance of road bridges, the total height of the vehicle crane in the driving state should be $\leq 4.0$ m. With respect to the unloaded weight, there are also specified restrictions due to the limited load carrying ability of bridges.

Vehicle cranes have a chassis with a stable framework extending in the center of the vehicle in the longitudinal direction of the vehicle. Under this framework, in most of the conventional constructions the axles of at least two wheel pairs extend, some of which can be driven and steered. The wheels are attached to the framework by means of appropriate suspensions.

The outriggers on which the vehicle crane rests during the crane operation and which are indispensable for the crane operation are also connected with the framework. In the conventional 4-point-support, four extendable or swivelling outrigger beams are provided, at the free ends of which each a hydraulic outrigger cylinder and a stabilizer plate are provided. The conventional outrigger beams are extended or swivelled in the direction transverse to the longitudinal axis of the framework to such an extent that the vehicle crane has a sufficient overturn stability when lifting loads. Conventionally, two outrigger beams extendable in opposite directions are provided in the region of the leading vehicle framework end and two outrigger beams extendable in opposite directions are provided in the region of the trailing vehicle framework end.

Above the framework and supported by the same, a slew ring is provided which carries the complete crane superstructure. The crane superstructure comprises a framework denoted turntable, which carries the crane boom (jib) with its basic member and its telescoping members as well as the lift gear erecting the boom. Naturally, each automotive vehicle crane has appropriate driving and steering facilities for the chassis, driving facilities for the turntable as well as facilities for operating the lift gear and for telescoping in and out the telescoping members as well as for lifting and lowering loads.

FIG. 5 schematically shows a plan view on the framework and outrigger construction of conventional vehicle cranes. A framework 111 extending in the longitudinal axis of the vehicle for a four-axle vehicle crane is represented. At the leading end of the framework, two front outrigger beams 101, 102, which can be hydraulically extended in the direction transverse to the longitudinal axis of the framework and which in their retracted state (not shown) are accommodated in cases 100, are represented in their extended position,. The outrigger beams 101, 102 comprise at their free ends each a hydraulic outrigger cylinder with a stabilizer plate 103, 104. Furthermore, at the trailing end of the framework, two rear outrigger beams 104, 105, which can be hydraulically extended in the direction transverse to the longitudinal axis of the framework, are represented in their extended position as well as the accommodation cases 99 associated to the outrigger beams 104, 105.

In the crane operation, a vehicle crane only rests on the outrigger cylinders, as the wheels of the chassis are lifted off the ground or the road.

In the conventional framework and outrigger construction, the framework 111 is subject to two kinds of stresses during crane operation, namely firstly to a bending stress and secondly to a torsional stress. The bending stress primarily results from the load to be lifted by the jib during crane operation. Due to this load the framework is subject to bending, and consequently the conventional vehicle framework is dimensioned such that it is sure to cope with the maximum bending stresses occurring during operation.

A torsional stress on the framework of the crane vehicle always occurs when loads are lifted the straining point of which is laterally outside the vehicle framework. Loads which are lifted laterally of the longitudinal axis of the vehicle cause a torsional stress in dependence on the geometry of the jib, under which stress the vehicle framework has the tendency to twist between the two front outriggers and the two rear outriggers.

As such a torsional stress can lead to a permanent deformation of the framework or even to a fracture thereof, conventional crane vehicle frameworks are dimensioned so solidly that in all load cases occurring during the crane operation no deformation of the framework is to be feared. For this purpose, heavy constructions and high dimensions are also common in the region of the two framework ends, i.e. in those regions in which the accommodation cases 100, 99 for the front and the rear outrigger beams are provided. In particular for the mentioned reason, the framework has a considerable height and consequently a considerable unloaded weight.

As a consequence of the above illustrated conventional construction, in conventional vehicle cranes, the upper edge of the slew ring is situated approximately 1.80 m above the wheel tread (ground, road). As the turntable and the lift gear require a certain overall height, a maximum overall height of 1.40 m is left for the jib, i.e. the basic member thereof, if a total height of 4.0 m is not to be exceeded.

If the construction of a conventional vehicle crane is to be reconstructed to carry higher maximum loads, the framework and the outrigger beams have to have correspondingly stronger, in particular higher, dimensions and the dimensions of the jib have to be correspondingly stronger, in particular higher. Increased loads require an increased bending strength of the jib and, as the expert knows, the height of the jib enters into the conditional equation for the bending strength in the third power. Occasionally, efforts to adapt the conventional construction principle to lift heavier loads very soon result in achieving or exceeding the prescribed admissible total height (in the driving state) of the vehicle crane of maximally 4.0 m and at the same time to a corresponding undesired increase of the unloaded weight of the vehicle crane.

The object underlying the invention is to provide a vehicle crane, the construction of which permits, in comparison to conventional constructions, a reduced overall height, in particular up to the upper edge of the slew ring, i.e. of the truck, and a reduced unloaded weight, in particular of the truck.

This object is solved by the subject matters of claims 1 and 6. The progress which can be achieved by means of the invention results from the achieved overall height reduced compared to the conventional construction (in particular of the truck) and the achieved reduced unloaded weight, in particular of the truck.

Due to the fact that the truck construction in the vehicle cranes according to the invention is lower than in conventional vehicle cranes of the same efficiency (load capacity), the dimensions of the crane boom (jib) can be selected to be larger, which results in an increased load capacity. As the expert knows, with a crane boom an increased bending strength, i.e. an increased lifting capacity, can be achieved by increasing the height. The reduction of the unloaded weight (in the region of the truck), which can be achieved as a consequence of the construction according to the invention, permits an increase of the unloaded weight in the region of the superstructure, in particular in the region of the crane boom, without exceeding optionally prescribed maximum unloaded weights. Thus, the above mentioned increase in the overall height of the crane boom can lead to an increase in weight in the superstructure, which, however, does not necessarily result in an increase of the total unloaded weight due to the achieved reduction in weight in the region of the truck. The reduction of the unloaded weight in the region of the truck achieved by the invention, however, can also be used for accommodating a greater number of telescoping pieces in a crane jib of a predetermined overall height than was possible in the past.

The above statements show that the vehicle crane construction according to the invention offers multifarious possibilities to the engineer for increasing the capacity, be it in the region of the maximum load or in the region of the maximum hoisting height (crane boom length).

Preferred embodiments of the invention are stated in the subclaims.

In a vehicle crane according to the invention having a maximum capacity of 120 t, for example the upper edge of the slew ring is situated at a height of about 1.20 m above the wheel tread, the crane vehicle's upper edge being about 3.50 m.

For a vehicle crane having a maximum capacity of 800 t, due to the construction according to the invention, an overall height of the crane boom of 2.0 m can be provided, without a total height of 3.95 m being exceeded.

Preferred embodiments and further designs of the invention can be taken from the subclaims.

Due to the 4-point-support according to the invention, the vehicle framework is practically exclusively subject to bending stresses during crane operation, as in the construction according to the invention torsional stresses are practically excluded. This favorable behaviour primarily results from the fact that in the construction according to the invention the front point of support and the rear point of support are at least essentially located in the region of the longitudinal axis of the vehicle, which passes through the swivel of the slew ring and that furthermore in the extended state the two lateral outriggers are situated on an imaginary line passing through the center of motion of the slew ring. It is typical of the 4-point-support according to the invention that the vehicle framework additionally takes over the function of an outrigger beam, which makes dispensable the front and rear transverse beams which have turned out to be disadvantageous and which are typical of the prior art, and that in particular the vehicle frame only has to be dimensioned to offer a sufficient bending strength.

It is pointed out that the 4-point-supports according to the invention are not only appropriate for the vehicle cranes of the type described and represented in this application, but that they are also appropriate for vehicles with a completely different design of the superstructure. For example, a telescoping fireman's ladder can be assigned to the crane jib or the jib can be designed as a telescoping fireman's ladder and conventional superstructure constructions can be used, for example those in which the jib end of the crane boom points to the front in the driving state, seen in the direction of motion. Moreover, the 4-point-support designed according to the invention can be used in crane vehicles or vehicles derived from crane vehicles as well as in vehicle cranes in which more than one cab is provided.

The 4-point-support according to the invention is characterized by the fact that two of the total four outriggers are included in the vehicle framework or are assigned to the vehicle framework, while the two further outriggers are provided at travelling or swivelling outrigger beams, which are kept in the region of the slew ring bearing at least during the crane operation. If the two latter outriggers are extended and are in their operating positions, an imaginary straight connection line extends between the outrigger cylinders of the two latter outriggers perpendicularly to the longitudinal axis of the framework and through the center of the slew ring. The center of motion of the slew ring is preferably situated on the mid-point of the distance between the two first outriggers, i.e. the outrigger assigned to the leading framework end and the outrigger assigned to the trailing framework end. The invention will be described more in detail by means of embodiments and referring to the drawings as follows, wherein:

Figure 1:
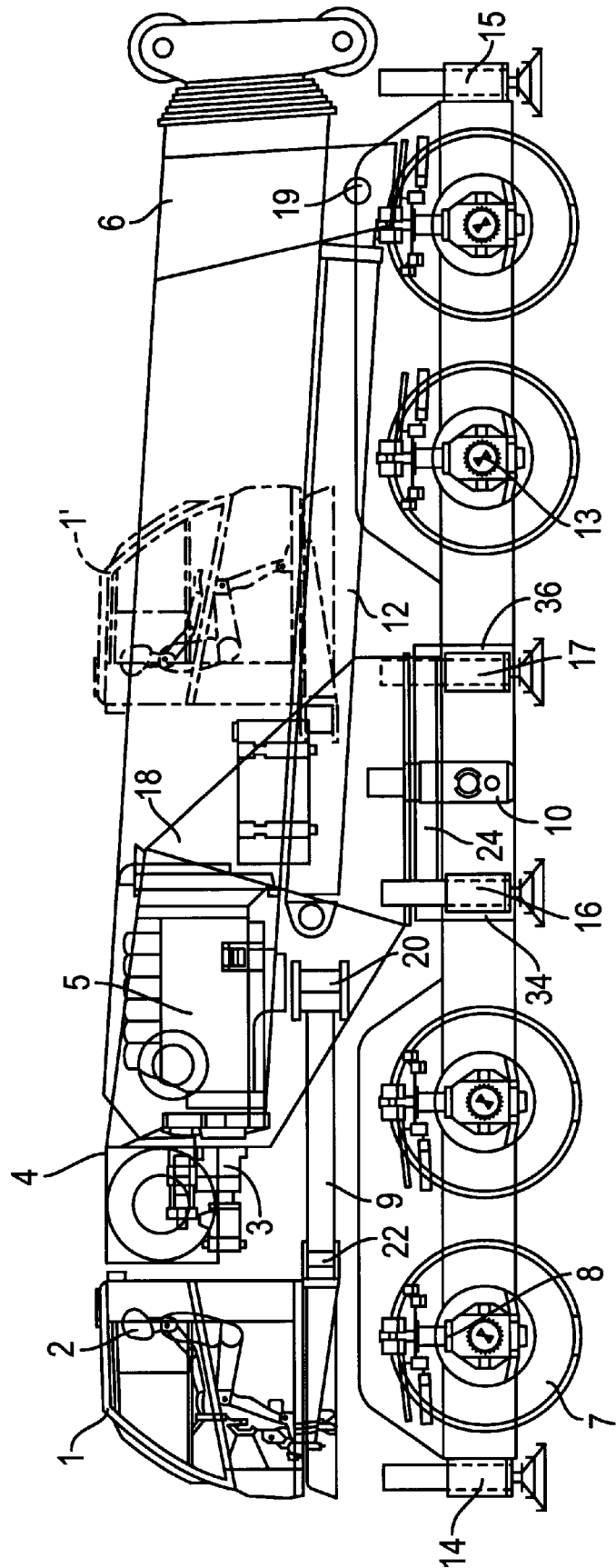
FIG. 1 shows a schematic side view of a four-axle embodiment.
Figure 2:
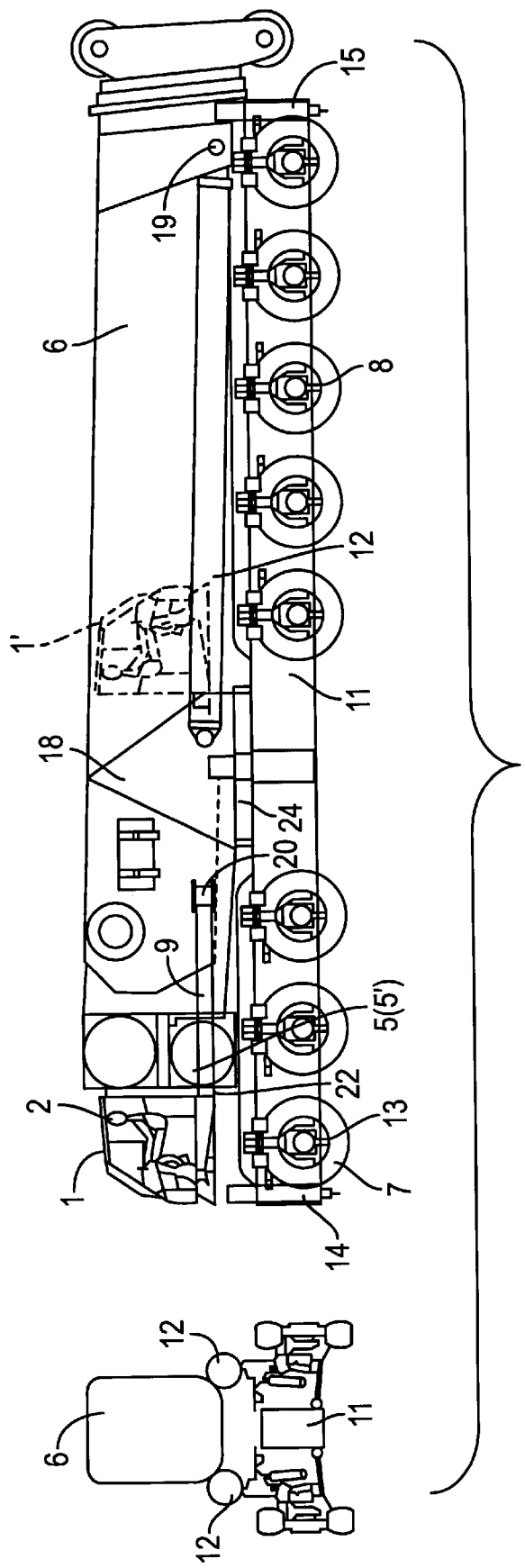
FIG. 2 shows a schematic side view of an eight-axle embodiment.

FIG. 1 shows a four-axle crane vehicle with the construction according to the invention, which is designed for a maximum load of 120 t and has a total height (in the driving state) of only 3.5 m and a total length of 10.87 m. The breadth of the represented vehicle crane is <3 m. The vehicle crane is shown in its driving position, wherein a cab 1 is represented in a solid line in front, seen in the direction of motion. Within the frame of the following description, "rear" is the direction opposite to the direction of motion, in which the outer jib end points in FIGS. 1 and 2. The terms "left" and "right" are used in the following description with respect to the direction of motion represented in FIGS. 1 and 2. Consequently, the vehicle wheels represented in FIGS. 1 and 2 are provided on the "left" side of the vehicle.

In the cab 1, an operator 2 is represented. The reference numeral 3 denotes a hydraulic drive pump and the reference numeral 4 denotes a pump power distributer. A crane boom (jib) denoted with reference numeral 6 is pivoted in the front region of the vehicle, so that the jib end points to the rear. In the represented embodiment of a 120 t vehicle crane, the crane boom comprises a basic member with eight telescopic members accommodated therein. An engine 5 for the driving operation as well as for the crane operation is also represented.

The vehicle crane has four axles at which altogether eight wheels 7 are mounted. Each wheel is independently suspended at a framework 11 extending into the longitudinal direction of the vehicle by means of a suspension denoted with reference numeral 8. Each wheel 7 has an own switchable hydro-engine which is assigned to the wheel hubs in a manner known per se. At least some of the wheels 7 can be steered by means of a schematically represented steering gear, this steering gear comprising a divisible steering shaft. This divisible steering shaft (not shown in detail) can be hydraulically unlatched and latched and guarantees that there is a mechanic steering interference in the steerable wheels when the vehicle crane moves on public roads. The hydro-engines (hydrostatic independent wheel drives), preferably integrated in the hubs of the wheels 7, do not require any connection to the vehicle framework 11 by means of axles, propeller shafts and so on.

The cab 1 is mounted on a turntable 18 together with the pump, the power distributor as well as the engine and the crane boom 6, the turntable being schematically represented in the figures in a solid line as a polygon. The lift gear 12 for erecting the crane boom, too, is mounted on the turntable 18.

The turntable 18 is mounted on a slew ring 24 pivoted in the vehicle framework 11, such that the complete rotatable superstructure is carried by the slew ring 24 in a manner known per se. The cab 1 is horizontally pivoted at the turntable 18 by means of a main swivel 20 and a slewing arm 9. From the position for the driving state shown in the left of FIGS. 1 and 2, the cab 1 can be slewed up to the position shown in a dot-dash line in the right of FIGS. 1 and 2, which is represented by reference numeral 1'. Between the position for the driving state and the extreme position marked with reference numeral 1', the cab 1 can be arbitrarily slewed. In order to permit the operator to exactly observe the crane boom in the crane operation at every intermediate position between the two extreme positions shown in the figures, an additional swivel 22 is provided. This additional swivel 22 permits horizontally slewing the cab, independent of the slewing of the slewing arm 9 about the main center of motion 20. The additional swivel 22 connects two partial sections of the slewing arm 9. At least in the driving operation, the cab 1 can be bolted to the chassis (vehicle framework 11).

The upper edge of the slew ring 24 is situated at a relatively low height and in any case under the highest point of the tires of the wheels 7 assigned to the chassis. As wheels including the tires for vehicle cranes often have a diameter of 1.4 m, the result is that the upper edge of the slew ring 24 has a height of about 1.30 m above the wheel tread of the wheels with tires. If a ground clearance of 0.4 m is taken as a basis for the vehicle framework 11, and if a height of 0.5 m is assumed for the vehicle framework, the result is a height of about 0.9 m of the lower edge of the slew ring. If a height of the slew ring of 0.30 m is assumed, the result is a height of 1.20 m of the location of the upper edge of the slew ring. If a height of 0.4 m is assumed for the lift gear 12 arranged between the upper edge of the slew ring and the bottom side of the crane boom, the result is a height of 1.6 m of the upper edge of the lift gear, and as a consequence a height of another 1.90 m, be it for the upper edge of the cab or for the upper edge of the crane boom, can be disposed of before a total structural height of 3.5 m is reached. In FIGS. 1 and 2, the distances (a) between the axletrees are e.g. 1.7 m. In FIG. 1, the distance (b) between the two internal axles is 4.7 m and the distance (c), i.e. the length of the vehicle framework, is 10.5 m. The total length is stated to be 10.87 m in FIG. 1. It is appreciated that the mentioned dimensions only refer to a single embodiment. It is only of general importance that the upper edge of the slew ring in a crane vehicle for a load of 120 t can be lowered to about 1.20 to 1.30 m and at the same time a reduction in weight in the region of the truck (framework and outriggers) can be achieved.

On the mid-line between the two ends of the vehicle frameworks, the slewing axis of the slew ring 24 extends. The drive of the slew ring 24 can be effected in a known manner. As is furthermore represented in FIGS. 1 and 2, in the vehicle framework 11, a hydraulic rotary transmission leadthrough 10 is provided which permits to supply hydraulic mediums to the truck from the superstructure slewable relatively to the truck. The hydraulic rotary transmission leadthrough can be designed in a known manner.

As is represented in FIGS. 1 and 2, at the leading end of the framework 11, a front outrigger cylinder 14 with a stabilizer plate mounted at this cylinder is provided. At the trailing end of the vehicle framework, a rear outrigger cylinder 15 with a stabilizer plate mounted at this cylinder is provided. These two outriggers 14 and 15 are denoted as front outrigger (14) and rear outrigger (15) in the following. According to the embodiment represented in FIG. 1, two further outrigger cylinders, namely a left outrigger cylinder 16 with a stabilizer plate mounted at this cylinder and a right outrigger cylinder 17 with a stabilizer plate fixed thereto are mounted in the region of the slew ring 24. In vehicle cranes, the slew ring as well as the bedding thereof (slew ring pot) normally have a particularly stable design which is particularly resistant to torsion, as the slew ring and the bedding thereof are subject to maximum stresses during crane operation.

In the embodiment shown in FIG. 1, in the region of the slew ring 24 or in the region of the bedding thereof, respectively, two hydraulically extendable outrigger beams (cf. FIG. 3) are provided, at the ends of which the left outrigger cylinder 16 and the right outrigger cylinder 17, respectively, are fixed. In the crane operation, the front outrigger cylinder 14 and the rear outrigger cylinder 15, which are arranged in the course of the longitudinal axis of the vehicle framework or are assigned to this longitudinal axis, are extended until the stabilizer plates are supported on the ground. Furthermore, in the crane operation, the two outrigger beams are extended in the direction transverse to the longitudinal axis of the framework, the one outrigger beam being extended to the left seen from the top and the other outrigger beam being extended to the right seen from the top. The outrigger cylinders 16 and 17 fixed at the ends of these outrigger beams opposite to one another are extended downwards in the crane operation until their stabilizer plates are supported on the ground. Preferably, an imaginary straight connection line extends between the stabilizer plates of the extended left and right outrigger cylinders 16 and 17 through the center of the slew ring 24.

Reference numeral 19 denotes the attachment by which the outer end of the lift gear 12 is connected to the crane boom 6.

Figure 3:
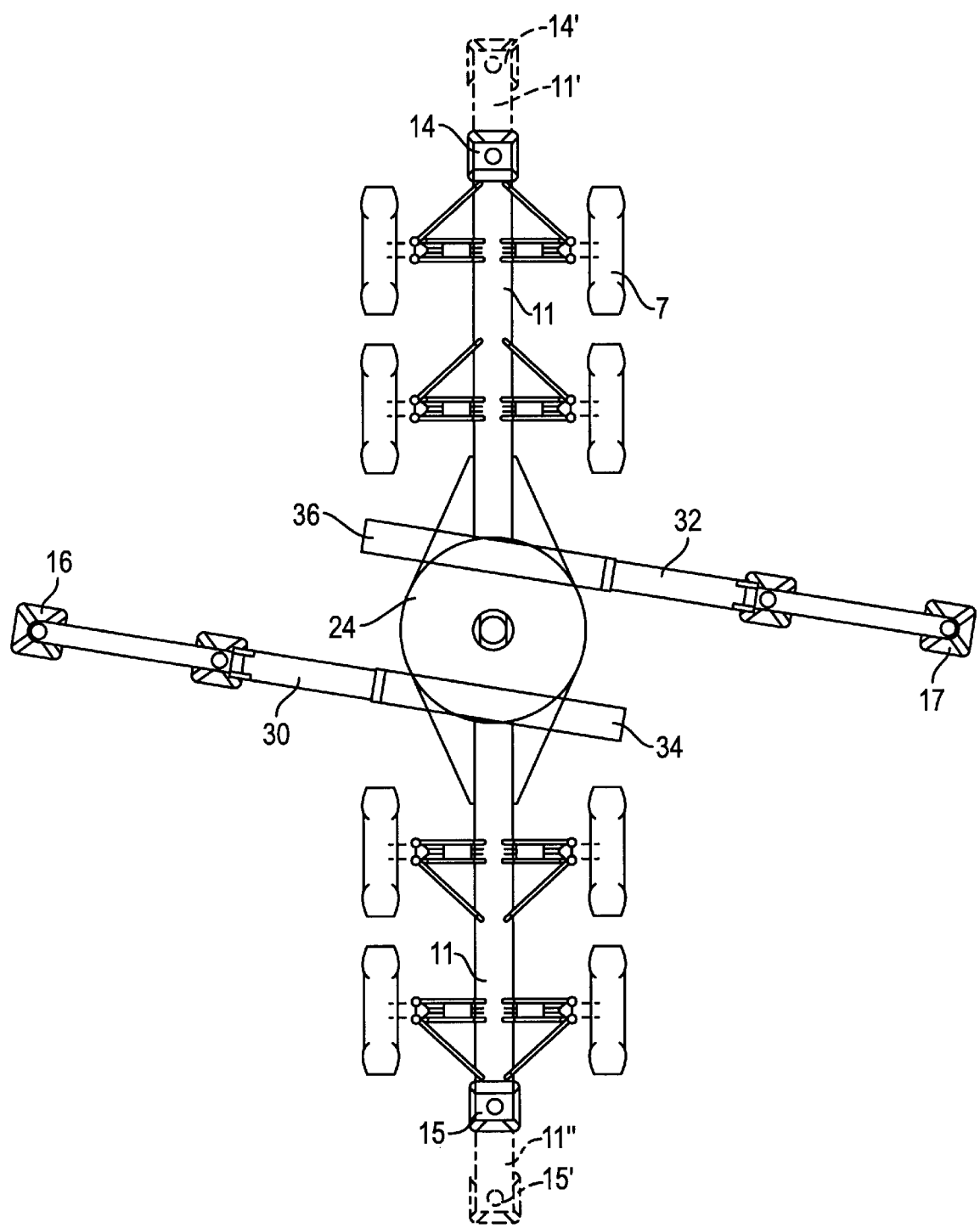
FIG. 3 shows a schematic plan view of a first embodiment of the 4-point-support according to the invention.
Figure 4:
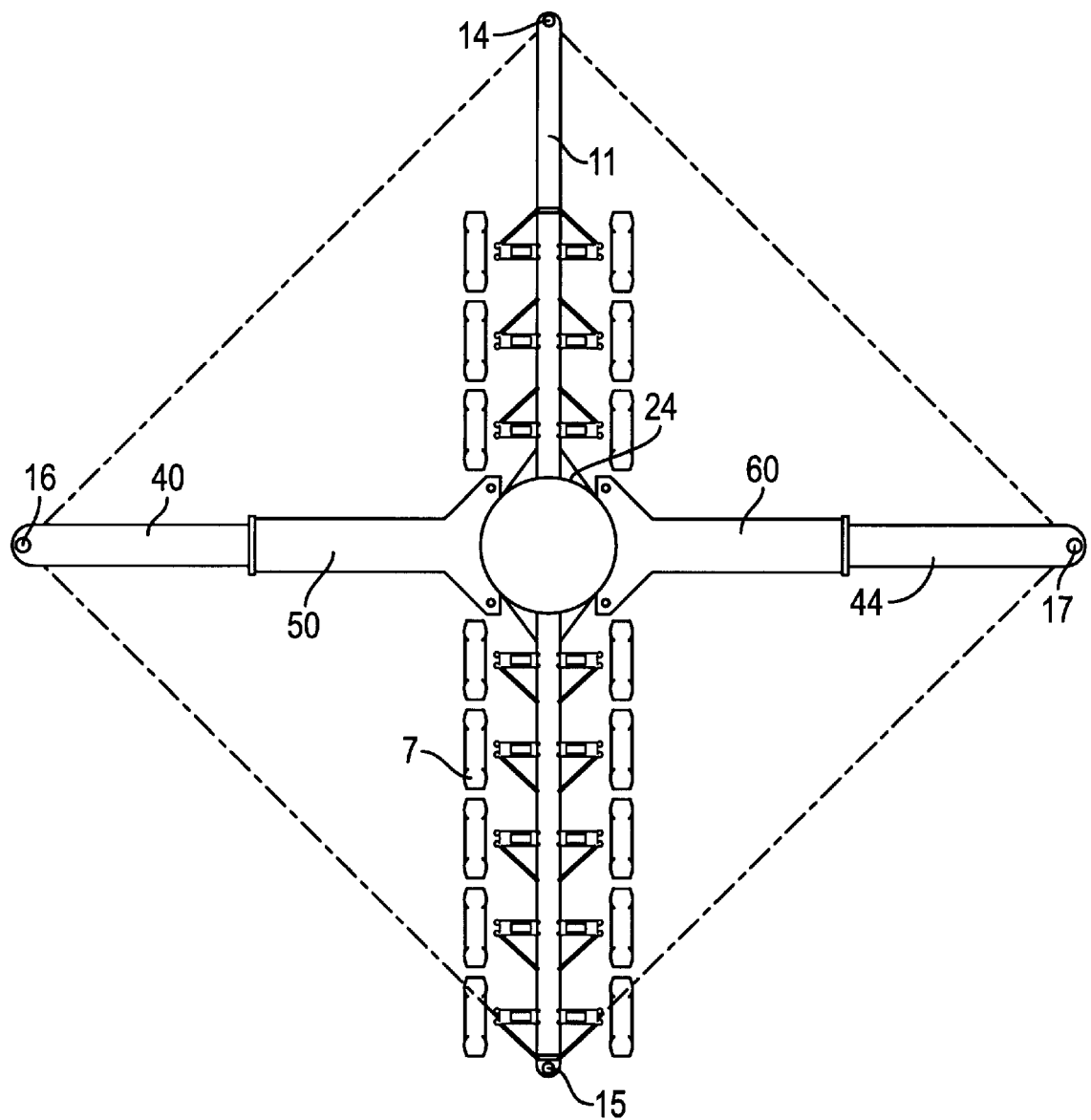
FIG. 4 shows a schematic plan view of a second embodiment of the 4-point-support according to the invention.
Figure 5:
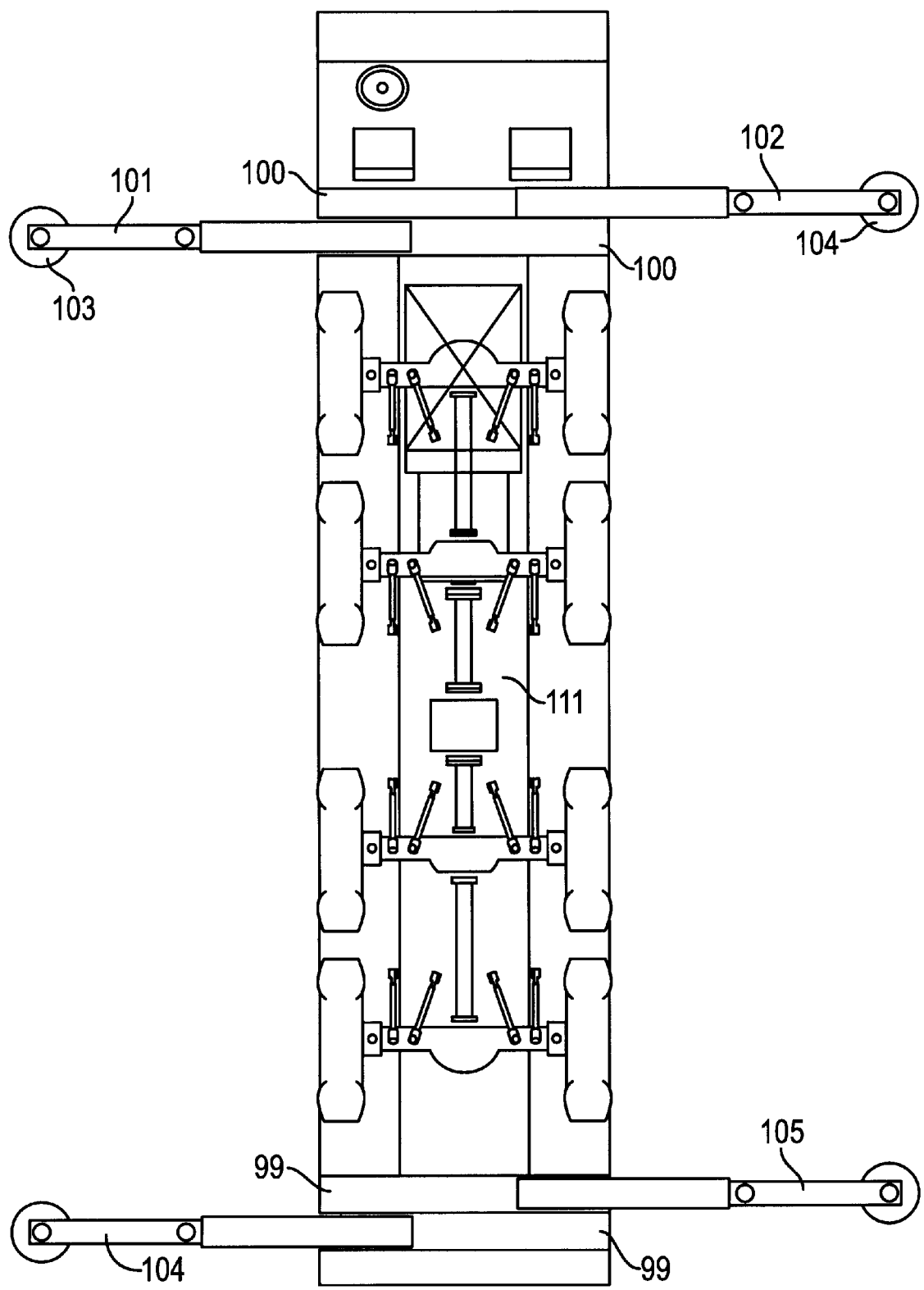
FIG. 5 shows a schematic plan view of a conventional 4-point-support.

The 4-point-support designed according to the invention is described more in detail by means of FIGS. 3 and 4.

In FIG. 2, a vehicle crane according to the invention with a maximum capacity of 800 t is schematically represented. This heavy load crane has 16 wheels arranged in pairs and is named "8-axle-crane" though it just as little comprises "axles" in the conventional sense as does the embodiment represented in FIG. 1. In FIG. 2, reference numerals have been chosen which are in accordance with those in FIG. 1. Apart from the differences discussed in the following, the vehicle crane according to FIG. 2 corresponds to the vehicle crane represented in FIG. 1. A difference is that the lift gear 12 does not have a one-cylinder design as in FIG. 1, but that the lift gear 12 consists of two parallel cylinders in the embodiment according to FIG. 2, as is schematically shown in the left of FIG. 2. This left-hand representation shows a section through the vehicle shown in the right half of the drawing. The crane boom 6 can be clearly seen which is arranged above two lift cylinders spaced apart, which are both denoted with reference numeral 12. It is obvious that two lift cylinders arranged in parallel require less overall height than one single lift cylinder dimensioned for the same purpose. It can be clearly seen that at the vehicle framework 11, the wheels 7 are linked by means of upper and lower transverse links.

The crane vehicle according to FIG. 2 also has a cab 1, which can be slewed by means of a slewing arm 9 between the driving position up to the position drawn in a dot-dash line and denoted with reference numeral 1'. For slewing the cab, a main swivel 20 and an additional swivel 22 are provided as described by means of FIG. 1.

Thanks to the construction according to the invention, the 800-t-vehicle crane according to FIG. 2 can have a length of 16.5 m between the front outrigger cylinder 14 and the rear outrigger cylinder 15. As a total length, 18.0 m (from the front outrigger cylinder to the extreme end of the crane boom 6) are sufficient. For this crane boom lifting 800 t, a basic member and six telescoping pieces are provided. As can be seen from the left-hand representation in FIG. 2, the construction according to the invention permits a height of 2.0 m of the crane boom 6, without a total height of 3.95 being exceeded despite this surprisingly great height. For the vehicle crane according to FIG. 2, two diesel engines 5, 5' are provided which can be appropriately used for the driving operation or for the crane operation, respectively, partly individually and partly together.

As already mentioned, in the represented embodiment the distances (a) between the axletrees (wheel centers) are 1.7 m. The distance between the two innermost axletrees is 4.5 m in this example. As discussed by means of FIG. 1, the slewing axis of the slew ring 24 extends on the mid-line of the distance between the front outrigger cylinder 14 and the rear outrigger cylinder 15. The lateral outrigger cylinders preferably provided for the embodiment according to FIG. 2 are described by means of FIG. 4.

FIG. 3 shows a 4-point-support in particular appropriate for vehicle cranes with capacities of up to about 400 t. The vehicle framework 11 extending in the longitudinal direction of the vehicle is represented, which comprises at its leading end a front outrigger 14 and at its trailing end a rear outrigger 15. The outriggers 14 and 15 are fixed at outrigger beams 11' (front) and 11" (rear), respectively, which preferably can be extended hydraulically. These outrigger beams 11' and 11" can be extended by 1 m each in the embodiment shown in FIG. 3, whereby the distance between the front outrigger and the rear outrigger can be elongated by 2 m in the extended state. It is appreciated that arbitrary other lengths can be provided for the outrigger beams 11' and 11". In the extended state, the front outrigger is denoted as 14' and the rear outrigger is denoted as 15'.

In the region of the bedding of the slew ring 24, a left outrigger beam 30 and a right outrigger beam 32 are mounted. These two outrigger beams 30 and 32 can be extended, preferably hydraulically, in opposite directions, in case of the outrigger beam 30 to the left and in case of the outrigger beam 32 to the right. In the not extended state, the beams are accommodated in schematically represented cases 34 and 36, respectively (cf. FIG. 1). The two lateral outrigger beams 30 and 32 and the cases 34, 36 accommodating them are supported in the bedding for the slew ring 24 which usually is very solid and resistant to torsion. As is schematically represented, the two outrigger beams 30 and 32 can be extended to an arbitrary extent between a completely retracted and a maximally extended position. In the completely extended state, an imaginary straight connection line runs between the centers of the two lateral outrigger cylinders 16 and 17 through the center of the slew ring 24, as represented in FIG. 3 in a dot-dash line.

The accommodation cases 34, 36 for the two lateral outrigger beams 30, 32 are arranged in parallel and intersect the longitudinal axis of the vehicle at an angle different from 90°. Due to this angle, one achieves that, without exceeding the provided maximal breadth of the crane vehicle, the length of the accommodation cases is longer than with an orientation perpendicular to the longitudinal axis of the vehicle. The support for the slew ring 24 can be designed as usual in form of a slew ring pot. As can be taken from FIG. 3, in the illustrated embodiment the accommodation case 36 is situated in front of the center of the slew ring 24 and the second accommodation case 34 is situated behind the center of the slew ring, seen in the direction of motion.

Due to the 4-point-support according to the invention, the vehicle framework 11 is practically exclusively subject to bending in the crane operation, as in the construction according to the invention torsional stresses are practically excluded. This favorable behaviour primarily results from the fact that in the construction according to the invention the front point of support 14, 14' and the rear point of support 15, 15' are situated at least essentially in the region of the longitudinal axis of the vehicle, which passes through the swivel of the slew ring 24 and that furthermore in the extended state the two lateral outriggers 16 and 17 are situated on an imaginary line passing through the center point of the slew ring 24. It is typical of the 4-point-support according to the invention that the vehicle framework additionally takes over the function of an outrigger beam, which makes dispensable the front and rear transverse beams which have turned out to be disadvantageous and are typical of the prior art, and that in particular the vehicle framework 11 only has to be dimensioned to offer a sufficient bending strength.

In the embodiment represented in FIG. 3, the wheels 7 are schematically indicated and the direction of motion is shown by an arrow. The 4-point-support represented in FIG. 3 is preferably determined for the embodiment of the vehicle crane according to the invention represented in FIG. 1. Naturally, the stated dimensions do not claim universal validity. As is stated with respect to FIG. 1, in the embodiment represented therein, the distance between the front outrigger cylinder 14 and the rear outrigger cylinder 15 is 10.5 m. By extending the two lateral outrigger beams 30 and 32 to their position shown in FIG. 3, a distance of 10 m results between the left outrigger cylinder 16 and the right outrigger cylinder 17. As furthermore stated, with extended longitudinal outrigger beams 11' and 11", a tilting line of 3.87 m results.

In FIG. 4, an embodiment of the 4-point-support designed according to the invention is represented, which is particularly appropriate for vehicle cranes with capacities of more than about 400 t. It is the 4-point-support represented in FIG. 4 with which the crane vehicle having eight axles represented in FIG. 2 is preferably equipped. As in the embodiment according to FIG. 3, an outrigger cylinder 14 (front) and an outrigger cylinder 15 (rear) each are assigned to the leading framework end and the trailing framework end. Furthermore, a left lateral outrigger cylinder 16 and a right lateral outrigger cylinder 17 are provided. These two lateral outrigger cylinders 16 and 17 are fixed at extendable outrigger beams 40 (left) and 44 (right), which in turn are arranged in swivelling holders 50 and 60, which are supported at the bedding of the slew ring 24. These swivelling holders 50 and 60 can be swivelled from a position essentially extending in parallel to the longitudinal axis of the vehicle for the driving operation into the working position of the crane operation represented in FIG. 4, in which the outrigger beams 40, 44 extend transversely to the center axis of the framework 11. The outrigger beams 40, 44 can be provided in separately designed holders instead of such swivelling holders, which are transported separately and mounted in the region of the slew ring bedding only at the building ground when passing over to the crane operation, advantageously such that the straight connection line between the extended lateral outrigger cylinders 16 and 17 passes through the center of the slew ring 24, as represented in FIG. 4.

As in the embodiment according to FIG. 3, in the embodiment according to FIG. 4, too, the above mentioned imaginary straight connection line, which connects the lateral outrigger cylinders 16 and 17 in the extended state, intersects the longitudinal axis of the vehicle at an angle of 90°.

Furthermore, one can take from FIGS. 3 and 4 that in the preferred embodiments, the center of the slew ring 24 is situated at the mid-point of the front outrigger cylinder 14 and the rear outrigger cylinder 15. In the crane operation, thereby the center of the slew ring is situated on the mid-point of the length of the framework supported by the two mentioned outrigger cylinders.

What is claimed is:

1. An automotive vehicle crane, comprising
   a framework provided in a longitudinal axis of the vehicle, said framework having a leading end and a rear end,
   a crane superstructure rotatable connected to said framework by a slew ring supported on the framework,
   a telescoping crane boom connected to said crane superstructure,
   a plurality of extendable outrigger cylinders,
   and a cab,
   wherein outrigger cylinders are connected to said vehicle framework along said longitudinal axis of the vehicle, a first outrigger cylinder connected to the leading framework end and a second outrigger cylinder connected to the rear framework end, said first and said second outrigger cylinders being mounted on the vehicle framework in a horizontally extendable manner, and
   wherein a third and a fourth outrigger cylinder are connected to said framework proximate to said slew ring by a first and a second lateral outrigger beam, said lateral outrigger beams being extendable relative to said framework so as to move said third and fourth outrigger cylinders in a direction transverse to the longitudinal axis of the framework,
   wherein said cab can be pivoted relative to the crane superstructure and slew ring from a position provided for driving operation to a position appropriate for crane operation,
   wherein during driving operation the crane boom can be laid down pointing to the rear such that during driving operation, the cab is associated to the leading framework end while an end of the crane boom is associated to the rear framework end, and
   wherein the lateral outrigger beams are laterally extendable from a first and a second accommodation case such that said third and fourth outriggers and said slew ring lie in a straight line, said accommodation cases being arranged in parallel to one another, and said first and second cases being mounted on opposite sides of the slew ring on said framework.

2. A vehicle crane according to claim 1, wherein the cab is fixed at a first end of a slewing arm, a second end of said slewing arm is pivotably connected to the crane superstructure by a first swivel.

3. A vehicle crane according to claim 2, wherein a second swivel pivotably connects the cab to said slewing arm.

4. A vehicle crane according to claim 2, wherein said cab can be slewed from said position for driving operation about 180°, to said position for crane operation, and wherein said position for driving operation is proximate to said leading end of said framework, and said position for crane operation is proximate to said slew ring.

5. A vehicle crane according to claim 1, wherein the cab can be temporarily fixed at said position for driving operation.

6. A vehicle crane according to claim 1, wherein the accommodation cases intersect the longitudinal axis of the vehicle at an angle different from 90°.

7. A vehicle crane according to claim 1, wherein the lateral outrigger beams are extendable such that a straight connection line connects the third and fourth outrigger cylinders and passes through the center of the slew ring perpendicular to said longitudinal axis.

8. A vehicle crane according to claim 7, wherein the connection line intersects the longitudinal axis of the vehicle at an angle of 90°.

9. A vehicle crane according to claim 1, wherein a center of the slew ring is arranged on the mid-point of a line between the first outrigger cylinder and the second outrigger cylinder.

10. A vehicle crane according to claim 1, wherein said four outrigger cylinders comprise a support which substantially reduces torsional stress during crane operation.

11. A vehicle crane according to claim 1, wherein said vehicle crane is capable of being driven at velocities of about 61 km/h or greater.

12. A vehicle crane according to claim 1, further comprising a plurality of wheels connected to said framework, wherein an uppermost point of said slew ring is lower than an uppermost point of said plurality of wheels.

* * * * *